Dec. 5, 1967     W. S. MILLER     3,356,966
LASER COOLER APPARATUS
Original Filed Jan. 15, 1962
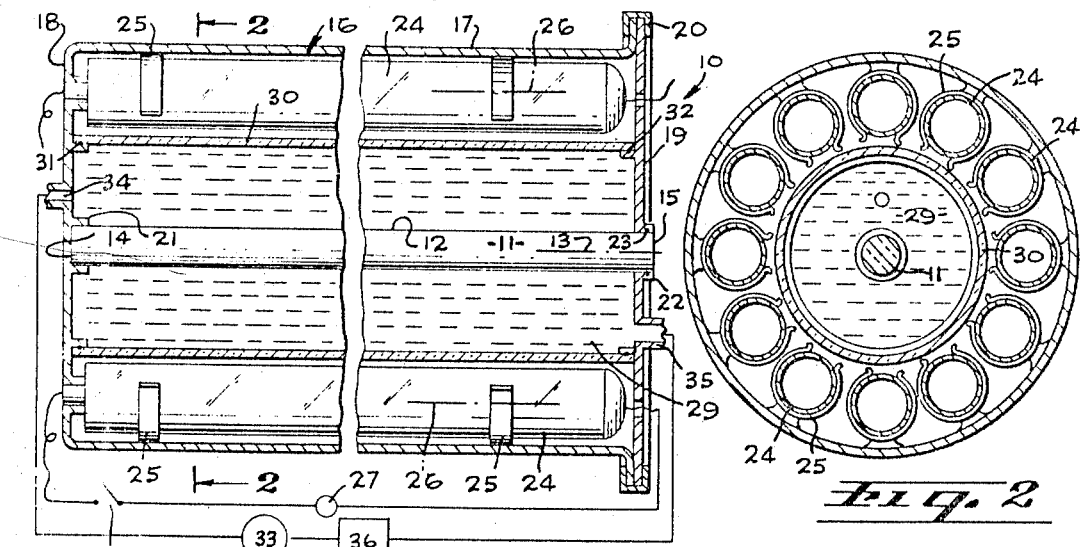
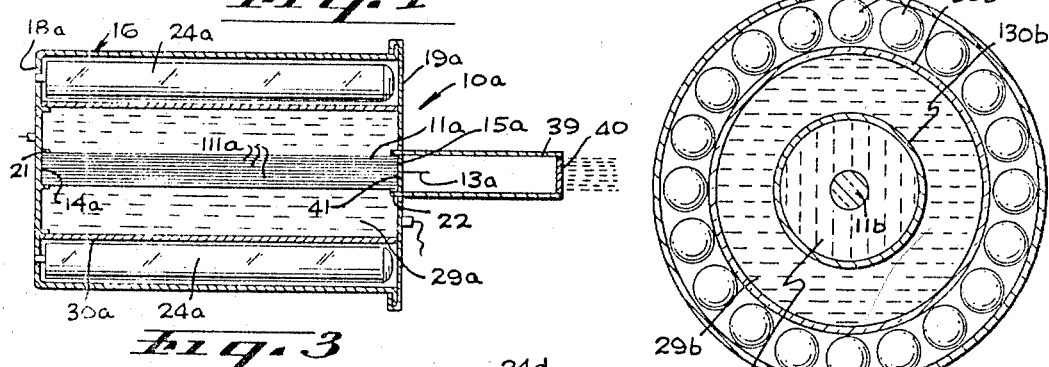
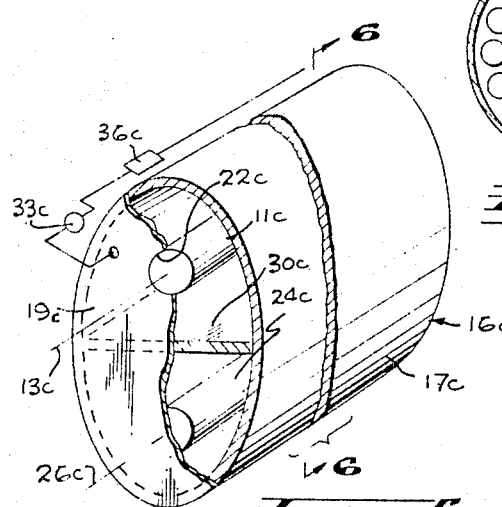
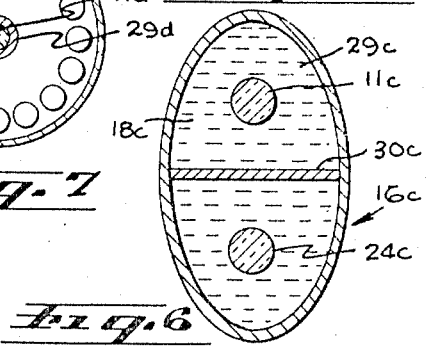
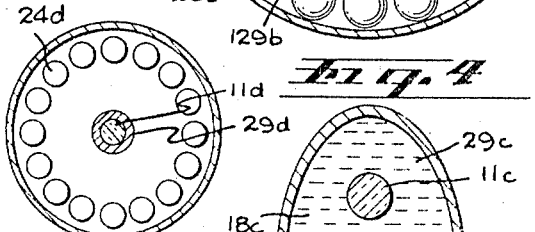
INVENTOR.
WENDELL S. MILLER
BY William P. Green
ATTORNEY

United States Patent Office 3,356,966
Patented Dec. 5, 1967

3,356,966
LASER COOLER APPARATUS
Wendell S. Miller, Los Angeles, Calif., assignor to American Optical Corporation, Southbridge, Mass., a corporation of Delaware
Continuation of application Ser. No. 166,136, Jan. 15, 1962. This application July 12, 1965, Ser. No. 484,778
6 Claims. (Cl. 331—94.5)

This application is a continuation of Serial No. 166,136, filed January 15, 1962.

This invention relates to an improved light emitting or amplifying device of the type referred to as a "LASER," that is, a device designed for "Light Amplification by Stimulated Emission of Radiation." The invention is particularly concerned with the provision of means for minimizing the heating of such a laser system in use.

A laser system includes a suitable crystal or other "lasering element," which when stimulated by light of a first frequency acts to emit light in a predetermined manner at a different characteristic emission frequency. More particularly, the lasering element or crystal is stimulated from its normal ground state quantum energy level to the upper of two excited quantum energy levels by light of the stimulating frequency, with the molecules of the element then decaying in a radiationless transition to the lower of the two excited levels, and subsequently emitting radiation of the characteristic emission frequency in returning from the lower excited level to the original ground state. This lasering action has been discussed in detail in recent literature, and therefore its theory will not be elaborated upon at length in the present specification.

In accordance with the above brief discussion, the term "lasering element" as used in this specification is defined as referring to any substance in condensed phase (solid or liquid, but usually in solid crystal form), which contains light absorption centers characterized by a ground state quantum energy level and at least two distinct excited quantum energy levels, with these three energy levels being such that the natural half-life for decay for the substance (in the absence of a radiation field) from the more excited level to the less excited level is shorter by substantially an order of magnitude or greater than the natural half-life for decay from the more excited level to the ground state. Where the term "light" is used in this specification, this term is defined as including radiation within the infrared frequency range as well as within the visible spectrum.

In conjunction with the lasering crystal or element, the usual laser system includes means for defining a specific mode of coherent light emission from the element, so that all or a large portion of the emitted light is aimed in a predetermined direction by the device to form a useable beam. For this purpose, the laser may include mirrors or mirror faces in a Fabry-Perot interferometer arrangement, acting to define the desired specific mode of coherent light emission.

One of the problems encountered in the past in laser systems has been that of preventing over-heating of the lasering element or crystal during a stimulation and emission cycle. In the usual laser system, the internal heating of the lasering element has been so great as to require a very long cooling period after each momentary emission period. As an example, the lasering element might be in operation for a fraction of a second, and be heated so much during that interval as to require as much as thirty seconds or more to cool before the next energization and emission cycle. This heating factor thus limits greatly the practical useability of the laser, and narrows the range of uses for which the device may be employed.

The general object of the present invention is to provide means for reducing the discussed heating of a lasering element in use, so that the cooling interval may be reduced, and the system may therefore have greater applicability to practical situations. For attaining this result, I preferably so devise the laser system as to facilitate the escape from the lasering crystal or element of radiation which is not properly aligned with the axis of the emitted light beam, so that this stray or unaligned radiation will not remain in the lasering element and by multiple internal reflection from the surfaces of the element continue to travel along a circuitous path therein sapping off energy from the emitting energy states into these undesired modes and thus raising the requirement for stimulating radiation together with the extra heating that results from the internal degradation of this radiation. As will be apparent, this internal travel of the "stray" or unaligned radiation within the lasering element can be a very substantial source of internal heating of the element. The discussed result of maximizing escape of the unaligned stray radiation from the element is attained by providing at a location laterally of and directly adjacent the lasering element, in the path of the stray radiation therefrom, a substance having a refractive index approximately matched to the refractive index of the lasering element. This substance may for example be a liquid surrounding the lasering element, or perhaps a solid disposed about or adjacent the lasering element, and having a refractive index approximately the same as that of the lasering element so that stray radiation is able to pass freely from the element and into the surrounding substance without being reflected at the surface of the lasering element back into its interior. In the past, the substance disposed about the lasering element has had a refractive index which is so abruptly different from that of the lasering element as to inherently encourage reflection of the stray radiation at the surface of the element, rather than permitting such radiation to emit laterally through that surface.

To further enhance the cooling of the system, the device preferably includes means for cooling the discussed substance which is received about or laterally adjacent the lasering element. For example, where the substance is a liquid, means may be provided for circulating that liquid along a cooling path, and through a suitable heat exchanger.

Another novel principal utilized in the present apparatus, for minimizing the heating of a laser system, involves the provision, laterally adjacent to or about the lasering element, of a substance which is especially chosen to be absorbent of the lasering or emission frequency of the element, but which is preferably transparent to the stimulating or exciting frequency of the element so that stimulating light may be passed through the substance to the element. The stray radiation of the emission frequency is then absorbed by this substance, and does not internally heat the lasering element itself.

The above and other features and objects of the present invention will be better understood from the following detailed description of the typical embodiments illustrated in the accompanying drawing, in which:

FIGURE 1 is an axial section through a first form of laser system constructed in accordance with the invention;

FIGURE 2 is a transverse section taken on line 2—2 of FIGURE 1;

FIGURE 3 is a view similar to FIGURE 1, but utilizing a different type of lasering element;

FIGURE 4 is a cross-sectional view similar to FIGURE 2, but showing another form of the invention;

FIGURE 5 is a fragmentary perspective view, partially broken away, of another form of laser system embodying the invention;

FIGURE 6 is a transverse section taken on line 6—6 of FIGURE 5; and

FIGURE 7 is a view similar to FIGURES 2 and 4, but showing still another form of the invention.

Referring first to FIGURES 1 and 2, the laser device or system 10 shown in these figures utilizes as its lasering element a crystal or other member taking the form of an elongated solid rod 11. More specifically, it may be assumed that rod 11 typically is a pink ruby crystal, the most satisfactory lasering substance found to date. Such a crystal has the desired three quantum energy levels, including a ground state level and at least two distinct excited levels. The crystal is adapted to be stimulated to one of its excited levels, by light of a critical frequency corresponding to 5600 angstroms wave length (green light). The crystal then decays from this level in a radiationless transition to a second and lower excited level, which we may refer to as the lasering level. The energy at this lasering level is then emitted in the form of radiation at a characteristic emission or lasering frequency corresponding to 6943 angstroms wave length (red light). In emitting this characteristic emission frequency, the crystal 11 of course returns to the initial ground state quantum energy level. In addition to the three levels mentioned, pink ruby crystal also has a third and still higher excited quantum energy level, to which it may be stimulated by radiation at a frequency corresponding to 4100 angstroms wave length. Whether stimulated by this 4100 angstrom radiation or the previously mentioned 5600 angstrom radiation, however, the molecules in either case decay without radiation to the same lasering level, from which 6943 angstrom emission is produced by return to the ground state level.

Crystal 11 preferably has an outer cylindrical surface 12 centered about longitudinal axis 13, and extending along the entire length of the crystal between its opposite parallel and planar end surfaces 14 and 15 which are disposed transversely of axis 13. End surface 14 is silvered or coated with a mirror surface facing into the interior of the crystal, and acting to reflect all light rays which impinge upon that surface from within the crystal. The opposite end surface 15 is partly silvered, to reflect back into the interior of the crystal some but not all of the light rays impinging on surface 15 within the crystal. Some of the light rays from within the crystal may pass through the partly silvered mirror surface 15 of the crystal, to form a coherent unidirectional light beam emitting from crystal 11 to the right as viewed in FIGURE 1, parallel to and along axis 13. As will be apparent, the two silvered surfaces 14 and 15 form a Fabry-Perot interferometer system, acting to internally reflect light within crystal 11 in a manner defining a specific mode of coherent light emission from the crystal, in the direction of axis 13. Thus, a high intensity beam may be emitted along axis 13 with all of the emitted radiation being substantially parallel to the axis.

The lasering element 11 of FIGURE 1 and FIGURE 2 is contained within an outer fluid-tight opaque housing or shell 16, typically having a cylindrical wall 17 centered about axis 13 and integral with an end wall 18 disposed transversely of that axis. The opposite end of the housing may be closed by a transverse opaque cover or end wall 19, suitably secured to part 17 as by a peripheral fluid-tight clamp represented at 20. The left end of crystal 11 is located centrally within the housing by reception in a boss structure 21, and the right end of the crystal is located relative to end wall 19 by reception within a tubular center portion 22 forming an opening through which the emitted light may leave the housing. A fluid-tight seal between parts 11 and 19 may be formed by an O-ring represented at 23.

Crystal 11 may be illuminated or stimulated by a series of parallel circularly spaced xenon flash tubes 24, which may be secured to wall 17 of the housing by suitable clamps 25, with the tubes typically being of straight cylindrical configuration and centered about individual axes 26 disposed parallel to axis 13 and spaced uniformly thereabout. The tubes 26 are adapted to be electrically energized by a suitable power source 27, under the control of a switch 28 (only one of the xenon tube circuits being completed in FIGURE 1), and when energized these tubes act to emit high intensity radiation within the visible spectrum (including light of the two frequency bands capable of stimulating element 11, that is, the frequencies corresponding to 5600 angstroms and 4100 angstroms wave length). The inner cylindrical surface of side wall 17 of the housing, as well as the inner surface of end walls 18 and 19, may all be silvered to render them highly reflective of the radiation from xenon tubes tubes 24, to thereby reflect a maximum amount of that radiation radially inwardly to impinge on and enter lasering element 11.

Extending entirely circularly about lasering crystal 11, housing 16 contains a body of liquid 29, which directly contacts and surrounds the outer cylindrical surface 12 of element 11, and which is confined within a transparent cylindrical glass tube 30 spaced radially outwardly from element 11 and centered about axis 13. Tube 30 extends the entire distance from end wall 18 to end wall 19, and is sealed to those end walls in fluid-tight relation, as by two annular seal rings represented at 31 and 32. The liquid may be circulated continuously through housing 16 by a pump 33, acting to force the liquid into the housing at 34, to discharge from the opposite end of the housing at 35, after being heated by the radiation within the device. The heated liquid passes through a heat exchanging relation with the second fluid flowing into the exchanger at 37 and out of the exchanger at 38. From heat exchanger 36, the fluid is again taken by pump 33 to be recirculated through housing 16.

The liquid 29 surrounding tube 11 is selected to have a refractive index which is matched to, that is, is approximately the same as, the refractive index of the lasering element 11 which is contacted by the liquid. Also, this liquid 29 is preferably so chosen as to selectively transmit through the liquid radiation from tubes 24 of the two previously mentioned stimulating or exciting frequencies for crystal 11, specifically, the frequencies corresponding to wave lengths of 5600 angstroms and 4100 angstroms respectively. In addition, liquid 29 should be chosen to selectively absorb radiation of the characteristic emission or lasering frequency of crystal 11, which frequency is that corresponding to 6943 angstroms wave length.

In order that the liquid may have a refractive index matched to that of the pink ruby crystal (an average refractive index of 1.763), the liquid may be methylene iodide; and may have an aliphatic nitroso compound dissolved in it (such as nitrosopropane), for rendering the liquid selectively transparent to the two stimulating frequencies, and selectively absorbent of radiation at the emission wave length of 6943 angstroms. In this case, the nitroso radical of the aliphatic nitroso compound serves as the selective absorber of the 6943 angstrom radiation. The glass tube 30 about the liquid may be transparent to radiation of all visible wave lengths.

To now discuss the manner of operation of the laser device shown in FIGURES 1 and 2, assume that pump 33 is in operation, and is acting to continuously circulate liquid 29 through housing 16 and through cooler 36. Also, assume that switch 28 is then closed to simultaneously energize all of the xenon tubes 24. The stimulating radiation of 5600 angstroms and 4100 angstroms from tubes 24 passes through liquid 29 and into crystal 11. This radiation stimulates different molecules of the crystal to the two excited levels corresponding to these two stimulation frequencies respectively, and the molecules thus stimulated subsequently decay without the emission of radiation to a lower quantum energy level from which lasering emission is possible.

When the number of such energy states occupied exceeds the number of available ground states, the energy stored in the crystal at the quantum energy level to which it has decayed is suddenly emitted by the crystal as radiation at its characteristic emission or lasering frequency corresponding to 6943 angstroms wave length. The Fabry-Perot interferometer surfaces 14 and 15 reflect the bulk of this emission frequency radiation back and forth between surfaces 14 and 15 several times, in a manner aligning the radiation with axis 13, and ultimately causing the radiation to leave element 11 from the right end of the crystal in the form of a parallel ray beam, as previously discussed. This is a very intense coherent unidirectional beam, which may travel for very great distances without substantial flaring to an increased diameter.

Some of the emission frequency radiation produced within crystal 11 (6943 angstroms wave length) travels within crystal 11 in paths which are not parallel to axis 13, but are disposed at different angles to that axis. When that "stray" radiation within crystal 11 strikes the interior of surface 12 of element 11, that radiation is able to pass directly through the mentioned surface and into the body of liquid 29, by reason of the fact that the refractive index of liquid 29 is matched to the corresponding index of element 11. Once this radiation of 6943 angstroms enters liquid 29, it is absorbed by the nitroso radical within that liquid, and acts to heat the liquid. Such heat is continuously removed from the liquid by circulation through cooler 36, so that the heating of element 11 is kept considerably lower than in a conventional laser arrangement in which the stray radiation is reflected internally within, and acts to heat element 11.

FIGURE 3 represents a second type of laser 10a which may be considered as identical with that of FIGURES 1 and 2, except as to the manner of construction of lasering element 11a, corresponding to the pink ruby crystal 11 of FIGURE 1. In FIGURE 3, element 11a may take the form of a cylindrical bundle of parallel closely bunched and intercontacting fluorescent glass fibers, so selected as to serve together as a lasering element, having essentially the same type of lasering action discussed in connection with the pink ruby crystal 11. The individual fibers 111a may all extend parallel to axis 13a of the device, and may terminate at their opposite ends in two planes disposed transversely of axis 13a. The left ends 14a of fibers 111a may be fully silvered, to reflect completely any radiation from within the fibers back into the interiors thereof. The right ends 15a of the fibers may be free of any silver coating. The bundle of glass fibers may be held in a proper position in the housing by reception of one end of the bundle within a short tubular boss 21 carried by end wall 18a, and by reception of the opposite end of the bundle within an end portion 22 of a tube 39 which is carried by and projects from wall 19a in alignment with axis 13a. At its outer end, tube 39 may carry a transparent glass wall 40, which is partly silvered in a manner to reflect some but not all of the radiation impinging against its left side, while allowing the rest of that radiation to pass through glass wall 40 and to the right in the form of a coherent unidirectional beam of light. The silver coating on glass 40 thus serves with the silvered left hand ends 14a of fibers 111a to form a Fabry-Perot interferometer arrangement corresponding to that attained by the provision of the silvered and partly silvered surfaces 14 and 15 in FIGURE 1. A liquid 29a corresponding to that shown at 29 in FIGURE 1 surrounds the multi-fiber lasering element 11a, between that element and outer glass tube 30a, with the liquid typically being confined at the right end of the fibers by a glass wall 41, which is suitably sealed in fluid-tight relation to tube 39 and is desirably completely transparent to light at the emission frequency of glass fibers 111a.

The glass fibers in FIGURE 3 may typically be formed of a suitable uranium glass capable of a lasering action. Where such uranium glass is employed, the liquid 29a may be an aqueous solution of sugar and dye which has a refractive index matched to that of the uranium glass, and which acts to selectively absorb the emission frequency (yellow light) of uranium glass. The operation of the FIGURE 3 arrangement is of course substantially the same as that of FIGURES 1 and 2, except that the emission radiation is aligned by reflection back-and-forth between mirror elements 14a and 40 (with the radiation traveling part of the distance through fibers 111a and part of the way through air), rather than being reflected back-and-forth within the single lasering element 11 of FIGURE 1.

FIGURE 4 shows an arrangement which may be considered to be substantially the same as that of FIGURES 1 and 2, except that two concentric glass tubes 30b and 130b are provided within housing 16b, and two separate bodies of liquid 29b and 129b are provided in the device around center lasering element 11b, instead of having a single glass tube and a single liquid. Housing 16b, xenon tubes 24b, and lasering crystal 11b may all be the same as in FIGURE 1. In FIGURE 4 the two liquids 29b and 129b are at all times isolated from one another, and may have separate circulation systems, for circulating these liquids through separate coolers corresponding to the single heat exchanger shown at 36 in FIGURE 1. Tubes 30b and 130b and the two bodies of liquid 29b and 129b, all extend about element 11b along substantially its entire axial length, as do the xenon stimulating tubes 24b.

The inner liquid 129b directly contacts and completely surrounds element 11b, and is selected to have substantially the same refractive index as lasering element 11b, so that stray emission from this element may pass outwardly into liquid 129b in the manner previously discussed. Where the element 11b is a pink ruby crystal, liquid 129b may be methylene iodide, having a refractive index of 1.71. The second liquid 29b, about liquid 129b, is chosen to be selectively absorbent of radiation at the emission frequency of the pink ruby, that is, a frequency corresponding to 6943 angstroms wave length, and is selectively transparent to at least one of the stimulating frequencies of ruby 11b. For this purpose, I may employ as the liquid 29b an aqueous solution of naphthol green. Such a solution will transmit radiation of only a 5600 angstrom wave length. Glass tube 130b between the two liquids preferably has a refractive index which is intermediate between the corresponding indexes of the two liquids. If an aqueous solution of naphthol green is employed for liquid 29b, having a refractive index of 1.33, and methylene iodide is employed for liquid 29b, having a refractive index of 1.71, the glass tube 130b may have an intermediate refractive index of 1.5. Also, both of the tubes 30b and 130b may be substantially, completely transparent to radiant light of all frequencies.

In using the device of FIGURE 4 the lasering action is the same as described in connection with FIGURES 1 and 2, to produce an intense coherent unidirectional beam of light emanating from one end of lasering element 11b. The stray radiation passing laterally from element 11b flows into and through liquid 129b and tube 130b, and enters and is absorbed by outer liquid 29b. Thus, liquid 29b is heated by the radiation, and the resultant heat may be carried away by circulating the liquid 29b, and typically also liquid 129b, through suitable heat exchangers. Since both of the liquids, and tubes 30b and 130b, are capable of transmitting radiation from xenon tubes 24b to lasering element 11b at a stimulating frequency corresponding to 5600 angstroms wave length, the xenon tubes may effectively excite element 11b.

FIGURES 5 and 6 show another arrangement in which a single straight cylindrical xenon tube 24c acts to stimulate a lasering element 11c, which may be a pink ruby crystal of the type shown at 11 in FIGURE 1. In FIGURES 5 and 6, the housing 16c has a side wall 17c of ellipsoidal transverse section (see FIG. 6) closed at its opposite ends by parallel transverse ellipsoidal end walls 18c and 19c. Walls 17c, 18c, and 19c are of course opaque, with one end of element 11b projecting through an aperture 22c in end wall 19c, to emit a coherent beam along axis 13c of element 11c. Walls 17c, 18c, and 19c may all be internally silvered, to reflect internally light from tube 24c. Tube 24c and lasering crystal 11c have their parallel axes 26c and 13c located at the two foci (see FIG. 6) of the elliptical cross-section of wall 17c. Thus, all light rays emanating from tube 24c and impinging against the inner surface of wall 17c are reflected directly to lasering element 11c to stimulate it to a maximum extent.

The interior or housing 16c may be divided into two halves by a light filtering element or wall 30c, through which light must pass in traveling between elements 24c and 11c. The chamber above this filter element 30c, and about lasering element 11c, may be filled by a liquid 29c, which may be the same as that employed at 29 in FIGURE 1. Filter element 30c is desirably selected to transmit stimulating radiation from tube 24c to element 11c, but to absorb any radiation at the emission frequency of element 11c. For example, filter 30c may be a naphthol green filter, which will transmit only 5600 angstrom radiation, or a toluidine blue filter, which will transmit 5600 angstrom and 4100 angstrom stimulating radiation. Both of these filters will absorb the emission radiation of 6943 angstroms wave length. It is also possible to use filters having the cupric or ferrous ion therein, typically in the form of chlorides, for use with pink ruby lasering elements.

The liquid 29c within the device of FIGURES 5 and 6 may be continuously circulated through a pump 33c and cooler 36c, to take away heat which is absorbed by the liquid. The operation of the FIGURES 5 and 6 device will of course be apparent, since both the filter element 30c and liquid 29c act to transmit stimulating radiation from tube 24c to element 11c, with stray emission radiation from element 11c entering liquid 29c and being absorbed thereby or by filter 30c. The resultant heat is carried away by circulation of the liquid.

A variational arrangement similar to that of FIGURES 5 and 6 might include two liquids within the upper and lower chambers respectively of housing 16c, and corresponding to liquids 129b and 29b respectively of FIGURE 4. In this case, the upper liquid would have a refractive index matched to that of element 11c, while the lower liquid would be adapted to absorb the stray emission radiation, and to carry the resultant heat away by appropriate circulation of the lower liquid, or both liquids if desired.

FIGURE 7 shows another arrangement, which may be considered identical with that of FIGURE 1 except that a tube or sleeve 29d formed of a solid material is received about and in direct contact with lasering element 11d, instead of providing a liquid in contact with element 11d. Sleeve 29d is then given the same characteristics as liquid 29, that is, the sleeve has a refractive index essentially matched to that of lasering element 11d; and the sleeve is selectively transparent to the stimulating frequency from xenon tubes 24d and selectively absorbent of the emission radiation at 6943 angstroms wave length. Also, where such a solid material is employed about the lasering element, it is desirable that the solid sleeve 29d have a coefficient of expansion which is substantially the same as that of element 11d (in all directions in which there is expansion), to prevent a tendency for relative motion between these two elements upon heating.

If element 11d is a pink ruby lasering element, the sleeve 29d about it may be glass containing iron, compounded to have the proper coefficients of expansion. If element 11d is formed of uranium glass, then sleeve 29d may be composed of cobalt glass. In either case, the stimulating frequency passes from tubes 24d through sleeves 29d into lasering element 11d, while the stray radiation emitted from element 11d is allowed to pass outwardly without reflection into sleeve 29d, and is absorbed by that sleeve, to reduce the internal heating of element 11d.

In the arrangement of FIGURES 1 and 4, the glass tubes 30, 30b and 130b may have the same composition as sleeve 29d of FIGURE 7, if it is desired that some of the absorption of the stray radiation be effected by tubes 30, 30b and 130b, as well as the liquids.

To give another example of a typical combination of materials which may be employed in the FIGURES 1 and 2 form of the invention, it is contemplated that the lasering element 11 may if desired be formed of Samarium doped calcium fluoride, in which case the liquid 29 may be an aqueous solution of sucrose, containing 56.6% sucrose and 1/10 of one percent beta naphthol green dye. The previously discussed xenon tubes 24 are satisfactory light sources for use with these materials.

I claim:

1. The combination comprising an elongated lasering element adapted to be stimulated by radiation at a predetermined stimulating frequency and adapted to emit radiation at a predetermined lasering emission frequency, means for defining a specific mode of coherent radiation emission at said emission frequency from said lasering element, said mode being directed longitudinally of said element, stimulating means for supplying radiation at said stimulating frequency to said element, and a substance positioned only laterally of and directly adjacent said lasering element in the path of stray fluorescence radiation therefrom and having a refractive index approximately matched to the refractive index of said lasering element, for said fluorescent radiation said substance being selectively absorbent of said fluorescent radiation, and transparent to at least a spectral portion of said stimulating radiation.

2. The combination comprising an elongated lasering element adapted to be stimulated by radiation at a predetermined stimulating frequency and adapted to emit radiation at a predetermined lasering emission frequency, means for defining a specific mode of coherent radiation emission at said emission frequency from said lasering element, said mode being directed longitudinally of said element, stimulating means for supplying radiation at said stimulating frequency to said element, a substance positioned only laterally of and directly adjacent said lasering element in the path of stray fluorescence radiation therefrom and including a first component having a refractive index approximately matched to the refractive index of said lasering element for said fluorescent radiation, for said fluorescent radiation and a second component which is selectively absorbent of radiation at said fluorescence frequency said substance being transparent at said stimulating frequency.

3. The combination comprising a lasering element adapted to be stimulated by radiation at a predetermined stimulating frequency and adapted to emit radiation at a predetermined lasering emission frequency, means for defining a specific mode of coherent radiation emission at said emission frequency from said lasering element, stimulating means for supplying radiation at said stimulating frequency to said element, and methylene iodide liquid received laterally of and directly adjacent and contacting said lasering element in the path of stray radiation therefrom and having a refractive index approximately matched to the refractive index of said lasering element, said methylene iodide liquid having dissolved therein an aliphatic nitroso compound adapted to selectively absorb said emission frequency and to selectively transmit said stimulating frequency.

4. The combination comprising a lasering element adapted to be stimulated by radiation at a predetermined stimulating frequency and adapted to emit radiation at a predetermined lasering emission frequency, means for defining a specific mode of coherent radiation emission at said emission frequency from said lasering element, stimulating means for supplying radiation at said stimulating frequency to said element, methylene iodide liquid received laterally of and directly adjacent and contacting said lasering element in the path of stray radiation therefrom and having a refractive index approximately matched to the refractive index of said lasering element, said methylene iodide liquid having dissolved therein an aliphatic nitroso compound adapted to selectively absorb said emission frequency and to selectively transmit said stimulating frequency, said stimulating means taking the form of light source means disposed about but spaced from said lasering element, said liquid being disposed about said element radially between it and said light source means, means for cooling said liquid, and means for circulating said liquid through said last mentioned means.

5. The combination comprising a condensed state lasering element adapted to be stimulated by radiation at a predetermined stimulating frequency and adapted to emit radiation at a predetermined lasering emission frequency, means for defining a specific mode of coherent radiation emission at said emission frequency from said lasering element, stimulating means for supplying radiation at said stimulating frequency to said element, a first liquid disposed about and directly adjacent said element in the path of stray fluorescence radiation therefrom and having a refractive index approximately matched to the refractive index of said lasering element for said fluorescence radiation, a second element liquid disposed about said first liquid and adapted to selectively absorb said fluorescence radiation frequency, said stimulating means being disposed about said second liquid, and means for circulating both of said liquids along endless cooling paths, said liquids having different refractive indices, said aforementioned combination including a wall interposed radially between said two liquids and having a refractive index intermediate said refractive indices of said liquids.

6. The combination comprising an internally reflective shell having the cross-section of generally an ellipse with two foci, a lasering element positioned approximately at one of said foci and adapted to be stimulated by radiation at a predetermined stimulating frequency and to emit radiation at a predetermined lasering emission frequency, means for defining a specific mode of coherent radiation emission at said emission frequency from said lasering element, radiation source means at approximately the second of said foci for supplying radiation at said stimulating frequency to said element, and a filter disposed across said shell between said element and said radiation source means and adapted to selectively transmit said stimulating frequency and to selectively absorb said emission frequency.

References Cited

UNITED STATES PATENTS

| | | | |
|---|---|---|---|
| 2,929,922 | 3/1960 | Schawlow et al. | 331—94.5 |
| 3,087,374 | 4/1963 | Devlin et al. | 331—94.5 |
| 3,087,381 | 4/1963 | Moffatt | 88—107 |
| 3,153,204 | 10/1964 | Dunsmuir | 331—94.5 |
| 3,172,056 | 3/1965 | Stitch | 331—94.5 |

FOREIGN PATENTS 1,323,829   3/1963   France.

JEWELL H. PEDERSEN, *Primary Examiner.*

RONALD L. WIBERT, *Examiner.*